(12) United States Patent
Johansson et al.

(10) Patent No.: US 8,787,317 B2
(45) Date of Patent: *Jul. 22, 2014

(54) WIRELESS HANDOVER OPTIMIZATION

(75) Inventors: Stefan Johansson, Linkoping (SE); Daniel Larsson, Linkoping (SE); Peter Ostrup, Linkoping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/555,875

(22) Filed: Jul. 23, 2012

(65) Prior Publication Data
US 2012/0287905 A1 Nov. 15, 2012

Related U.S. Application Data

(63) Continuation of application No. 12/407,438, filed on Mar. 19, 2009, now Pat. No. 8,228,871.

(51) Int. Cl.
*H04W 4/00* (2009.01)

(52) U.S. Cl.
USPC .......................................... 370/331; 370/341

(58) Field of Classification Search
None
See application file for complete search history.

(56) References Cited

U.S. PATENT DOCUMENTS

| 2007/0293224 A1 | 12/2007 | Wang et al. |
| 2008/0318578 A1 | 12/2008 | Worrall |
| 2009/0086677 A1 | 4/2009 | Ho |
| 2009/0191874 A1 | 7/2009 | Du et al. |
| 2009/0196252 A1 | 8/2009 | Fischer |

FOREIGN PATENT DOCUMENTS

| EP | 1337125 A2 | 8/2003 |
| JP | 2001-36941 A | 2/2001 |
| WO | 2008140028 A1 | 11/2008 |
| WO | 2009022860 A1 | 2/2009 |

OTHER PUBLICATIONS

S2-070786; 3GPP Draft, "Impacts of moving PDCP to ENB", St. Louis, Missouri, USA, Feb. 12-15, 2007, retrieved from the internet on Feb. 26, 2010, 4 pages.
R2-062942, 3GPP Draft, "Security considerations for LTE", LG Electronics Inc., Seoul, Korea, Oct. 9-13, 2006, retrieved from the internet on Feb. 26, 2010, 4 pages.
3GPP TS 36.300 V8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 6 pages.
ZTE, "Impacts of moving PDCP to eNB", 3GPP TSG SA WG2 Architecture, S2-070786, Feb. 12-15, 2007, pp. 1-4.
Office Action issued on Jun. 25, 2013 in corresponding Japanese application No. 2012-500735 with English translation, 5 pages.
Decision of Rejection issued on Feb. 25, 2014 in corresponding Japanese application No. 2012-500735 (English translation only), 2 pages.

*Primary Examiner* — Chi Pham
*Assistant Examiner* — Soon-Dong D Hyun
(74) *Attorney, Agent, or Firm* — Rothwell, Figg, Ernst & Manbeck, P.C.

(57) ABSTRACT

Aspects of the present invention relate to improved systems and methods for handing over a UE from a source node to a target node. In some embodiments, the target node receives UL and DL count information directly from the UE being handed over, rather than from the source node or from a core network node.

22 Claims, 7 Drawing Sheets

WIRELESS HANDOVER OPTIMIZATION

This application is a continuation of application Ser. No. 12/407,438, filed on Mar. 19, 2009, which is incorporated by reference herein in its entirety.

TECHNICAL FIELD

The present invention relates to the field of wireless communication systems. More specifically, aspects of the present invention relate to systems and methods for handing over a user equipment between nodes.

BACKGROUND

In the 3rd Generation Partnership Project ("3GPP") Long Term Evolution ("LTE") protocol, a user equipment (UE) connects to the core network via nodes (e.g. e-UTRAN NodeB nodes). Typically, the UE connection is maintained over a single node. However, as the UE moves geographically or other network conditions occur, it may be desirable or necessary to transfer the UE connections from the source node (the node to which the UE is currently connected) to an available target node (i.e., perform a handover from the source node to the target node).

The UE connection with the source node is typically encrypted and the cipher requires uplink ("UL") and downlink ("DL") counts for each data unit, which comprise sequence numbers and/or a Hyper Frame Numbers ("HFN"). Thus, during a handover the source node must to transfer the UL and DL count values to the target node in order to enable the encryption features of the target node. In the standard 3GPP LTE protocol, this transfer is done in one of two ways depending upon the protocols enabled within the nodes.

If the nodes are configured to operate according to the S1 Application Protocol ("S1AP"), then the transfer of the UL and DL counts occurs via a two step process. First, during an eNB Status Transfer, the UL and DL counts are transmitted from the source node to a Mobile Management Entity ("MME") connected to the core network. Then, during an MME Status Transfer, the UL and DL counts are transmitted from the MME to the target node.

Alternatively, if the nodes are configured to operate according to the X2 Application Protocol ("X2AP"), then the transfer of the UL and DL counts occurs via a SN Status Transfer. During the SN Status transfer, the UL and DL counts are transmitted directly from the source node to the target node.

After a source node has sent the UL and DL counts to the target node, it must cease scheduling UE data (e.g. data received from the UE or data intended for the UE) so that the UL and DL counts remain accurate when they are received by the target node. It can also occur that a UE connects to a target node (and thus has disconnected from the source node) before the target node has received the UL and DL counts from the source node. In this situation, the UE cannot send or receive any data units via the target node until the target node acquires the UL and DL counts. Thus, during the handover process there can be an undesirable service interruption while the UE waits for the UL and DL counts to be transferred between the source and target nodes.

Furthermore, there may be a finite amount of time between when the UE disconnects from the source node (i.e., the source node stops scheduling UE data) and when the core network is notified that the UE has connected to the target node. During this time period, any DL data units intended for the UE may be sent to the wrong node or lost.

SUMMARY

Aspects of the invention provide improved systems and methods for handing over a UE from a source node to a target node. In some embodiments, the target node receives the UL and DL count information from the UE rather than other nodes in the network. In some embodiments, the source node continues to schedule UE data during the handover process and forwards the scheduled UE data to the target node to ensure all UE data is received.

Thus in one aspect, the invention provides an improved method performed by a source node for handing over a UE from a source node to a target node. In some embodiments, the improved method performed by the source node includes: (a) transmitting from the source node to another node a first handover message that indicates that the UE requires a handover; (b) receiving at the source node a second handover message transmitted from the another node in response to the first handover message; (c) in response to receiving the second handover message, transmitting from the source node a reconfiguration message to the UE; (d) after transmitting the reconfiguration message from the source node to the UE, continuing to schedule the UE in the source node until a particular message is received at the source node; and (e) after performing step (d), receiving at the source node a context release message transmitted from the another node indicating that the UE has been handed over to the target node.

In some embodiments, the another node is the target node. In such embodiments, the first handover message may be an X2AP Handover Request message, the second handover message may be an X2AP Handover Request Acknowledge message, and the context release message may be an X2AP UE Context Release message. In addition, the particular message may be an end marker transmitted from a gateway.

In some embodiments, the another node is an MME. In such embodiments, the first handover message may be an S1AP Handover Required message, the second handover message may be an S1AP Handover Command message, and the context release message may be an S1AP UE Context Release Command message. Additionally, the particular message may be the S1AP UE Context Release Command message In some embodiments, the improved method further comprises transmitting from the source node to the MME an S1AP UE Context Release Complete message in response to the S1AP UE Context Release Command message.

In some embodiments, the source node is configured such that the source node does not transmit to the MME a status transfer message in response to receiving the S1AP Handover Command message from the MME.

In some embodiments, the method further comprises a step of: (f) transmitting UE data from the source node to the target node after transmitting the reconfiguration message to the UE, wherein the UE data comprises data received from the UE or data intended for the UE.

In some embodiments, the method further comprises a step of: (f) after transmitting the reconfiguration message from the source node to the UE, continuing to (i) assign sequence numbers to DL data units intended for the UE and (ii) deliver data units received from the UE to a core network node until the particular message is received at the source node.

In another aspect, the invention provides a method performed by a UE. In some embodiments, the method includes the following steps: (a) establishing a connection with a source node; (b) after establishing the connection, transmitting data units to and receiving data units from the source node; (c) after step (b), receiving from the source node a reconfiguration message identifying a target node; and (d)

after receiving the reconfiguration message, transmitting to the target node a message (e.g. a reconfiguration complete message) comprising a DL count value and an UL count value.

In some embodiments, the DL count value comprises (1) a sequence number and/or (2) a HFN that the target node should assign to a DL data unit that does not have a sequence number assigned to it and that is intended for the UE; and the UL count value comprises (1) a sequence number and/or (2) a HFN.

In some embodiments, the method further comprises the steps of: (e) after receiving the reconfiguration message, receiving a resource allocation from the source node; and (f) using the allocated resources to transmit a data unit to the target node.

In another aspect, the invention provides a method performed by a target node. In some embodiments, the method includes the following steps: (a) receiving at the target node a handover request message transmitted from another node; (b) transmitting to the another node a handover acknowledge message in response to the handover request message; (c) after transmitting the handover acknowledge message and before scheduling the UE in the target node, receiving at the target node a message transmitted from the UE comprising a DL count value and a UL count value; and (d) after receiving the message from the UE, using the DL count value and/or the UL count value in a communication with the UE.

In some embodiments, the message transmitted from the UE is a reconfiguration complete message that was transmitted by the UE to the target node in response to a reconfiguration message transmitted to the UE from the source node.

In some embodiments, the DL count value comprises (1) a sequence number and/or (2) a HFN that the target node should assign to a DL data unit that does not have a sequence number assigned to it and that is intended for the UE, and the UL count value comprises (1) a sequence number and/or (2) a HFN.

In some embodiments, the method further comprises: receiving from the source node a DL data unit for the UE, and determining whether the DL data unit should be transmitted to the UE, wherein the determination is based on the DL count value received from the UE.

In another aspect, the invention provides an improved access point (e.g., base station or other access point). In some embodiments, the improved access point includes: (a) a first receiver for receiving data transmitted from a user equipment (UE); (b) a first transmitter for transmitting data to the UE; (c) a second transmitter for transmitting data to a node; (e) a second receiver for receiving data from the node; and (f) a data processing system operable to: (i) transmit to the node a first handover message that indicates that the UE requires a handover; (ii) receive a second handover message transmitted from the node in response to the first handover message; (iii) transmit a reconfiguration message to the UE in response to receiving the second handover message; (iv) continue to schedule the UE after transmitting the reconfiguration message to the UE, until a particular message is received; and (v) receive a context release message transmitted from the another node indicating that the UE has been handed over to a target node.

In another aspect, the invention provides an improved UE. In some embodiments, the improved UE includes: (a) a transmitter for transmitting data; (b) a receiver for receiving data; and (c) a data processing system operable to (i) establish a connection with a source node; (ii) transmit data units to and receive data units from the source node after establishing the connection; (iii) receive from the source node a reconfiguration message identifying a target node; and (iv) transmit to the target node a message comprising a downlink (DL) count value and an uplink (UL) count value in response to receiving the reconfiguration message.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
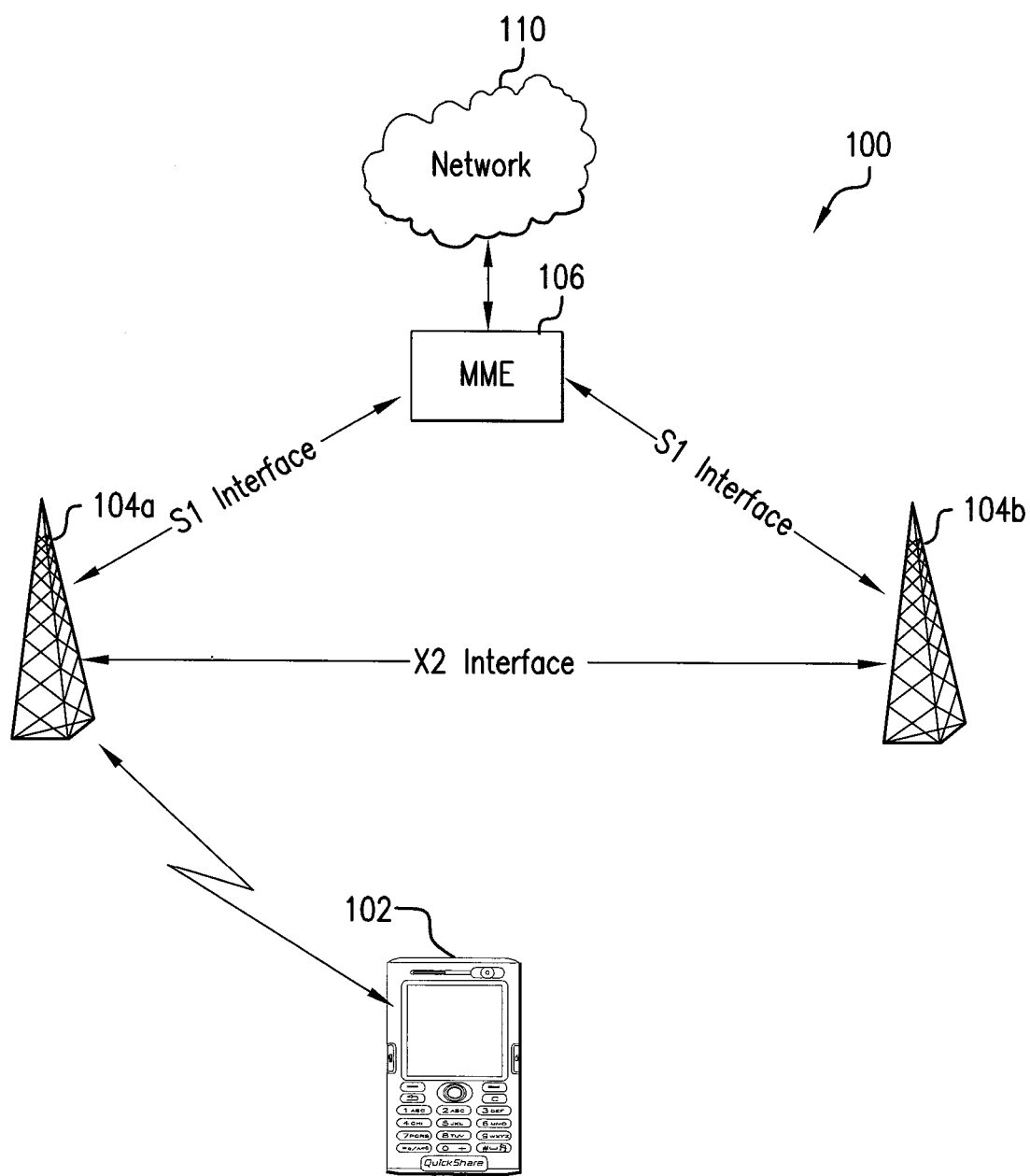
FIG. 1 illustrates a wireless communication network according to an embodiment of the invention.

Referring to FIG. 1, FIG. 1 illustrates a block diagram of a wireless communication network 100. As shown in FIG. 1, the wireless communication network 100 connects a UE 102 with a core network 110 via a plurality of nodes 104a, 104b (e.g., base stations 104a, 104b or other access points) connected to an MME 106. As shown in FIG. 1, the UE 102 is in wireless communication with a source node 104a. In some embodiments, the UE 102 can be a cellular telephone handset, a smartphone, a PDA, or other wireless device configured to interoperate with the wireless network 100. Each of the nodes 104a, 104b communicates with the MME 106, e.g. for sending and receiving UE data and for sending and receiving network management messages. In some embodiments, the nodes 104a, 104b communicate with the MME 106 according to the S1 application protocol. Also as shown in FIG. 1, in some embodiments the nodes 104a, 104b may communicate with each other, e.g. for sending and receiving data traffic of the UE 102 and for sending and receiving network management messages. In some embodiments, the nodes 104a, 104b communicate with each other according to the X2 application protocol.

Figure 2:
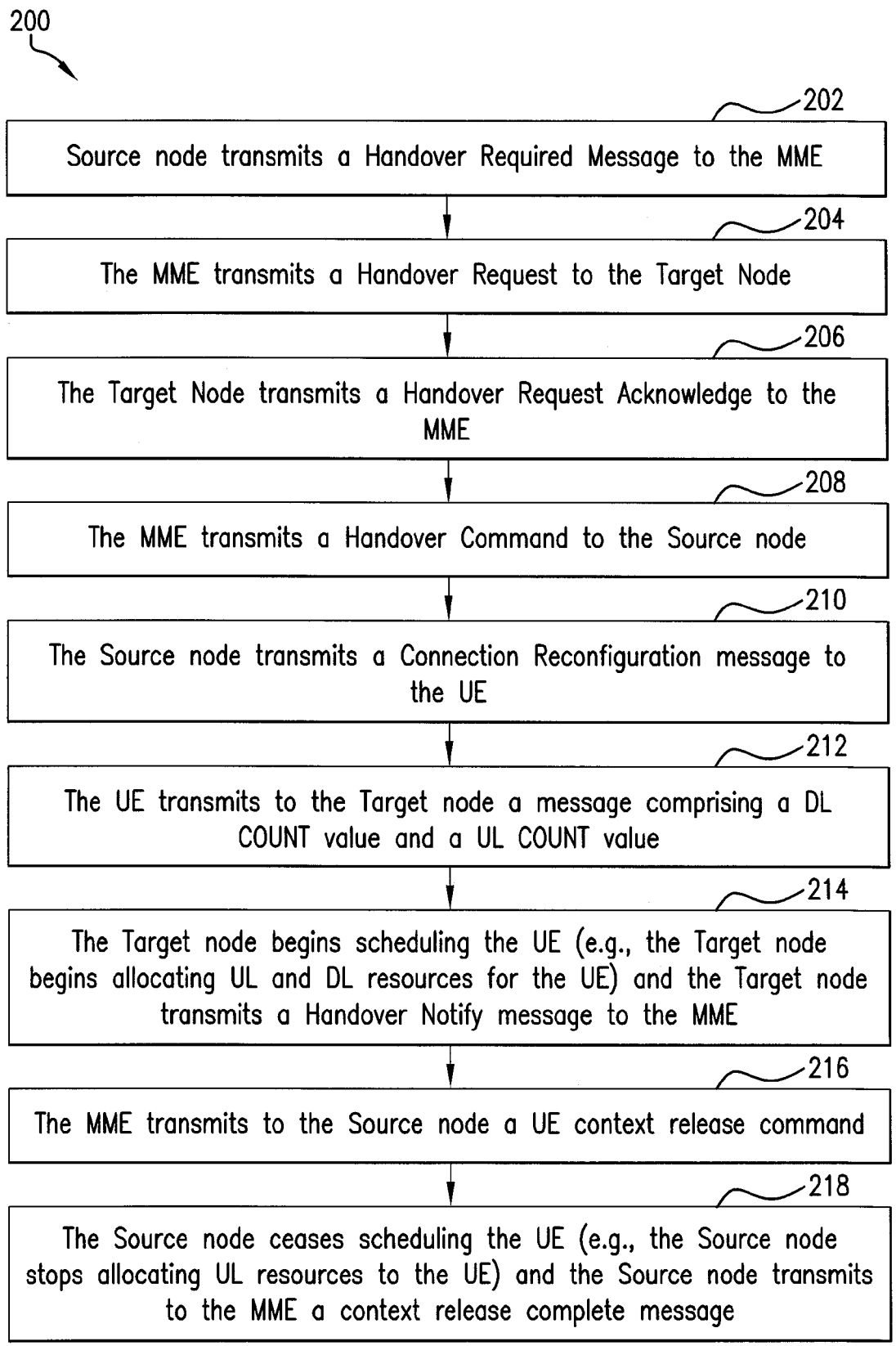
FIG. 2 is a flow chart illustrating a process according to some embodiments of the invention.

Referring to FIG. 2, FIG. 2 illustrates an improved handover process 200 for transferring the connection for a UE 102 between a source node (e.g., node 104a) and a target node (e.g., node 104b) according to some embodiments of the invention.

In the embodiment shown, the handover process 200 begins at step 202 when the source node 104a transmits an S1AP Handover Required message 301 (see FIG. 3, which shows a message flow according to an embodiment of the invention) to the MME 106, indicating that the UE 102 requires a handover.

In response to receiving the S1AP Handover Required message 301 from the source node 104a, at step 204 the MME 106 transmits an S1AP Handover Request message 302 to the target node 104b.

In response to receiving the S1AP Handover Request message 302 from the MME 106, at step 206 the target node 104b returns an S1AP Handover Request Acknowledge message 303 to the MME 106.

After the MME 106 receives the S1AP Handover Request Acknowledge message 303 from the target node 104b, at step 208 the MME 106 transmits an S1AP Handover Command message 304 to source node 104a.

Upon receiving the S1AP Handover Command message 304 from the MME 106, at step 210 the source node 104a transmits a Radio Resource Control ("RRC") Connection Reconfiguration message 305 to the UE 102.

In response to receiving the Connection Reconfiguration message 305 from the source node 104a, the UE 102 performs the reconfigurations necessary for executing the handoff. When the reconfigurations are complete, at step 212 the UE transmits a Connection Reconfiguration Complete message 306 to the target node 104b. The Connection Reconfiguration Complete message 306 includes a DL count value and an UL count value. In some embodiments, the DL count value includes (1) a sequence number and/or (2) a Hyper Frame Number (HFN) that the target node should assign to a DL data unit that does not have a sequence number assigned to it and that is intended for the UE, and the UL count value comprises (1) a sequence number and/or (2) a Hyper Frame Number (HFN). In some embodiments, the Connection Reconfiguration Complete message 306 comprises at least the information in an RRC Connection Reconfiguration Complete message, the DL count, and the UL count.

After the target node 104b receives the Reconfiguration Complete message 306 from the UE 102, at step 214 the target node begins scheduling traffic for the UE 102. For example, in some embodiments the target node 104b may allocate resources for the upload and download of data between the UE 102 and the external network. Furthermore, at step 214 the target node 104b transmits an S1AP Handover Notify message 307 to the MME 106.

In response to receiving the Handover Notify message 307 from the target node 104b indicating that the UE 102 is in communication with the target node 104b, at step 216 the MME 106 transmits an S1AP UE Context Release Command message 308 to the source node 104a indicating that the UE 102 has been handed over to the target node 104b.

After receiving the Context Release Command message 308, at step 218 the source node 104a ceases scheduling traffic for the UE 102 and transmits an S1AP UE Context Release Complete message 309 to the MME 106.

As set forth above, in some embodiments after the source node 104a transmits the Connection Reconfiguration message 305, the source node 104a may continue to schedule traffic for the UE 102 until the source node 104a receives the Context Release Command message 308.

Figure 3:
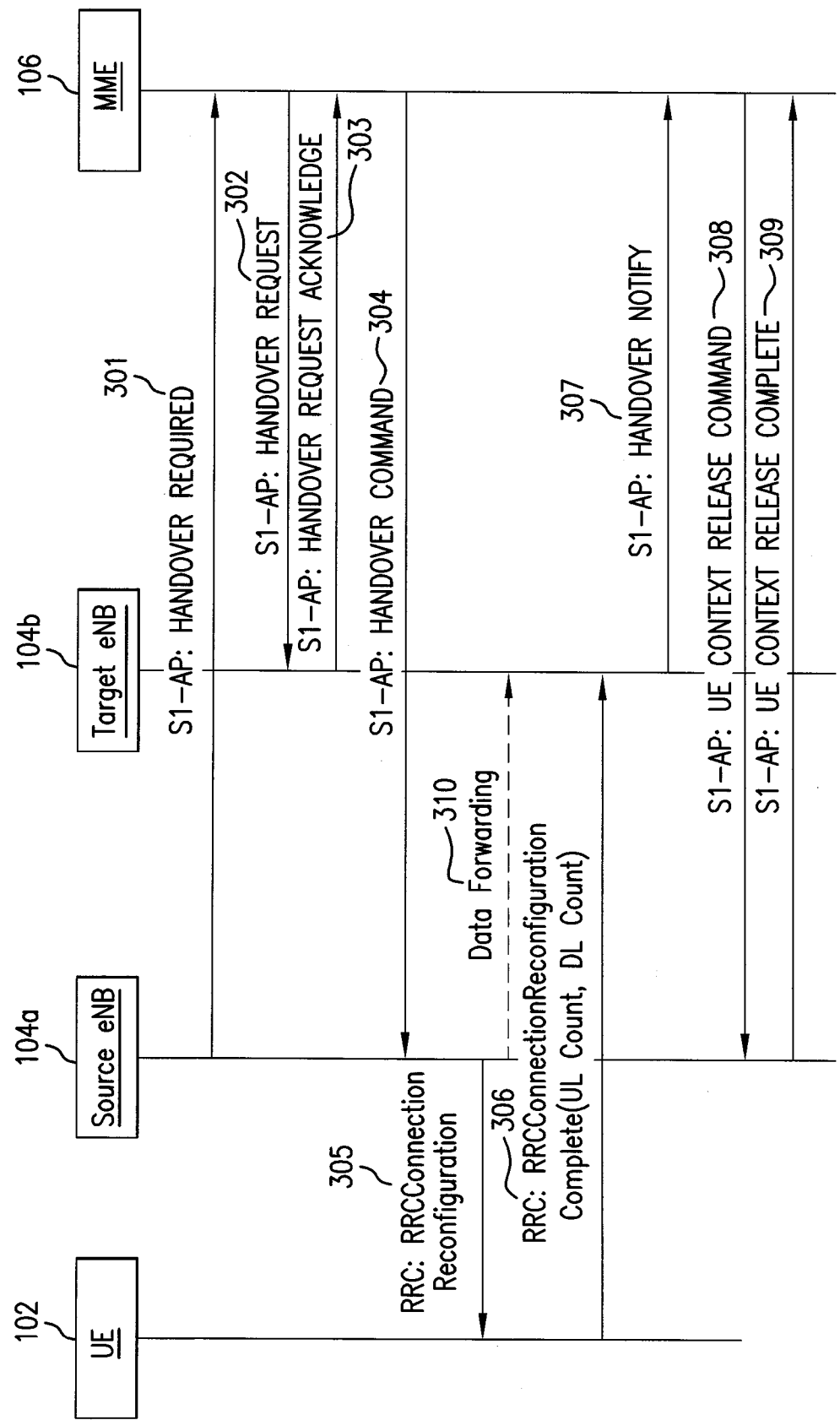
FIG. 3 illustrates a message flow according to an embodiment of the invention.

Referring again to FIG. 3, FIG. 3 illustrates a message flow according to some embodiments of the invention. As shown in FIG. 3, after the source node 104a transmits the Connection Reconfiguration message 305, it forwards UE data 310. In some embodiments, this may comprise continuing to deliver to the MME data units received from the UE until the Context Release Command message 308 is received. Additionally, the source node 104a may continue to assign sequence numbers to DL data units intended for the UE and transmit these units to the target node. The target node 104b determines whether to transmit forwarded packets to the UE based upon a comparison between the DL count information received in the Connection Reconfiguration Complete message 306 and the sequence numbers of the forwarded packets.

Figure 4:
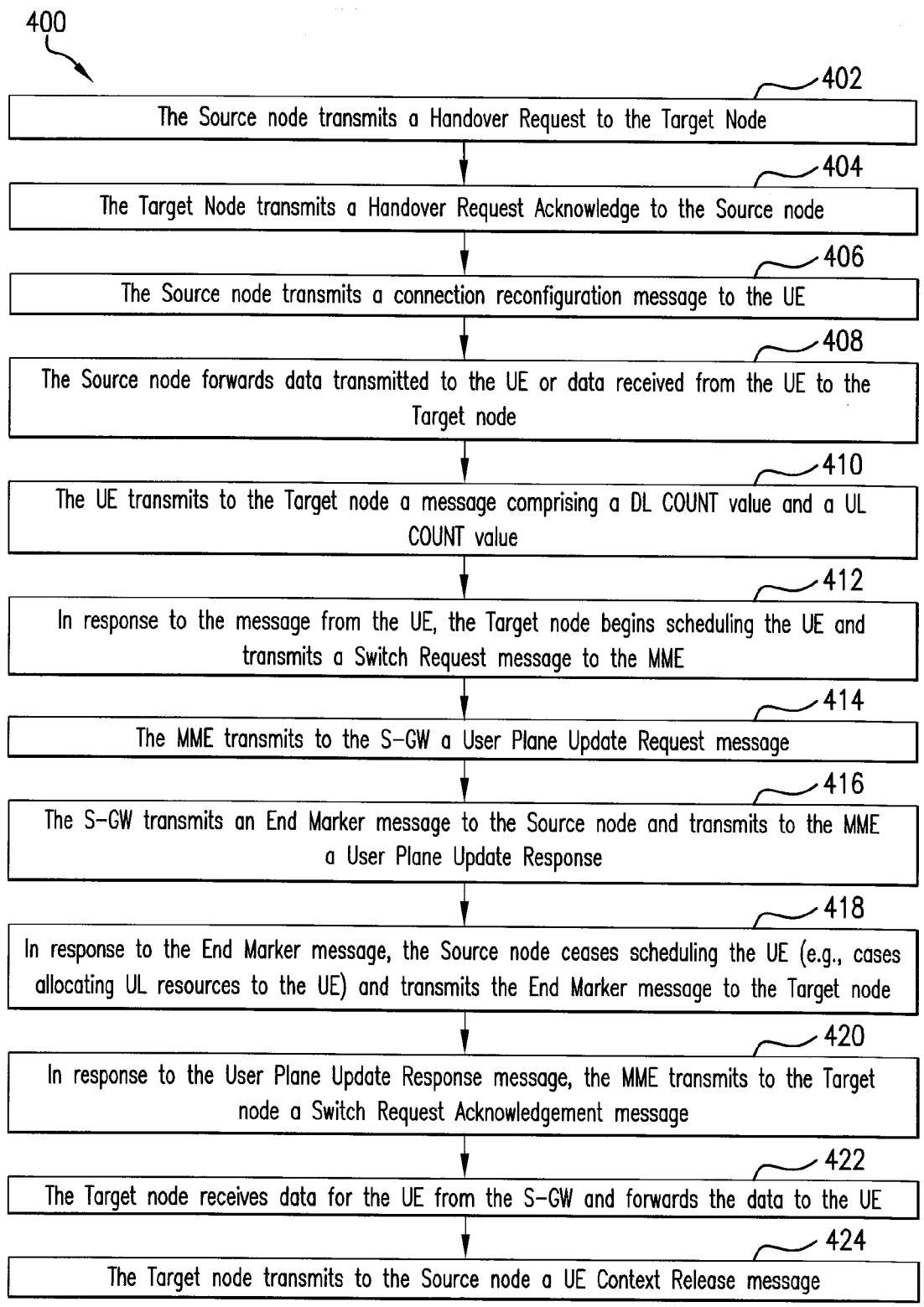
FIG. 4 is a flow chart illustrating a process according to some embodiments of the invention.

Referring to FIG. 4, FIG. 4 illustrates an improved handover process 400 for transferring the connection for a UE 102 between a source node (e.g., node 104a) and a target node (e.g., node 104b) according to additional embodiments of the invention.

Figure 5:
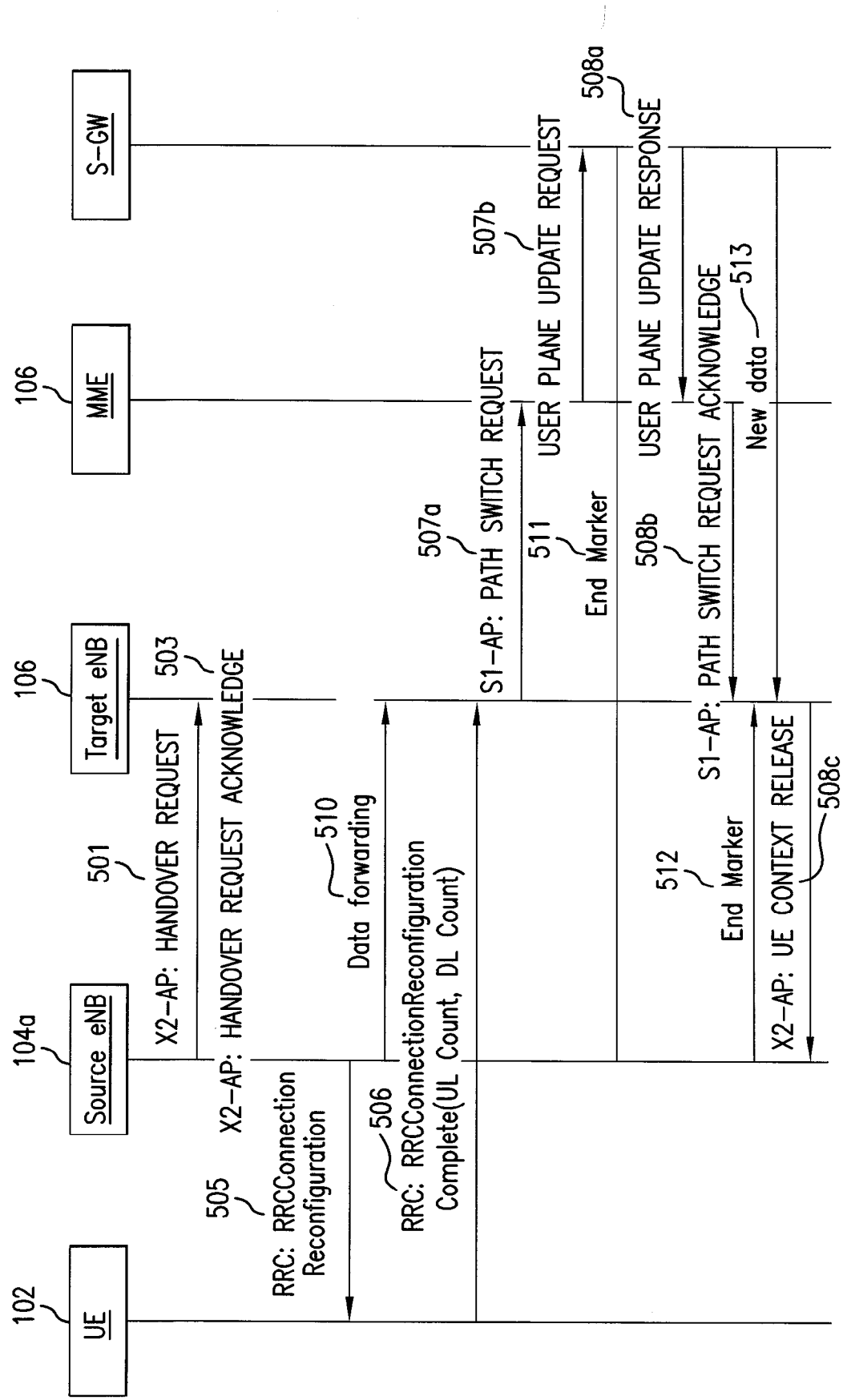
FIG. 5 illustrates a message flow according to an embodiment of the invention.

The handover process 400 begins at step 402 when the source node 104a transmits an X2AP Handover Request message 501 (see FIG. 5, which shows a message flow according to an embodiment of the invention) to the target node 104b, indicating that the UE 102 requires a handover.

In response to receiving the Handover Required message 501 from the source node 104a, at step 404 the target node 104b transmits an X2AP Handover Request Acknowledge message 503 to the source node 104a.

Upon receiving the Handover Request Acknowledge message 503 from the target node 104b, at step 406 the source node 104a transmits a Radio Resource Control ("RRC") Connection Reconfiguration message 505 to the UE 102.

After the source node 104a transmits the Connection Reconfiguration message 505, at step 408 the source node 104a forwards UE data 510 to the target node 104b.

In response to receiving the Connection Reconfiguration message 505 from the source node 104a, the UE 102 performs the reconfigurations necessary for executing the handoff. When the reconfigurations are complete, at step 410 the UE transmits a Connection Reconfiguration Complete message 506 to the target node 104b. The Connection Reconfiguration Complete message 506 includes a DL count value and an UL count value. In some embodiments, the Connection Reconfiguration Complete message 306 comprises at least the information in a RRC Connection Reconfiguration Complete message, the DL count, and the UL count.

After the target node 104b receives the Reconfiguration Complete message 506 from the UE 102, at step 412 the target node begins scheduling traffic for the UE 102. For example, in some embodiments the target node 104b may allocate resources for the upload and download of data between the UE 102 and the external network. Furthermore, at step 412 the target node 104b transmits an S1AP Path Switch Request message 507a to the MME 106.

In response to receiving the Path Switch Request message 507a from the target node 104b indicating that the UE 102 is in communication with the target node 104b, at step 414 the MME 106 transmits a User Plane Update Request 507b to the serving gateway ("S-GW").

At step 416, in response to receiving the User Plane Update Request 507b from the MME 106 the S-GW transmits a User Plane Update Response message 508a to the MME 106. Additionally in step 416, the S-GW transmits an end marker 511 to the source node 104a.

After receiving the end marker 511, at step 418 the source node 104a ceases scheduling traffic for the UE 102. After the source node 104a completes this process, it transmits an end marker message 512 to the target node 104b.

In response to receiving the User Plane Update Response message 508a, at step 420 the MME 106 transmits an S1AP Patch Switch Acknowledge message 508b to the target node 104b.

After the target node 104b receives the Patch Switch Acknowledge message 508b, at step 422 the target node 104b receives additional new UE data from the S-GW and transmits the UE data to the UE 102.

After the above steps have completed, at step 424 the target node 104b transmits a X2AP UE Context Release message 508c to the source node 104a.

Figure 6:
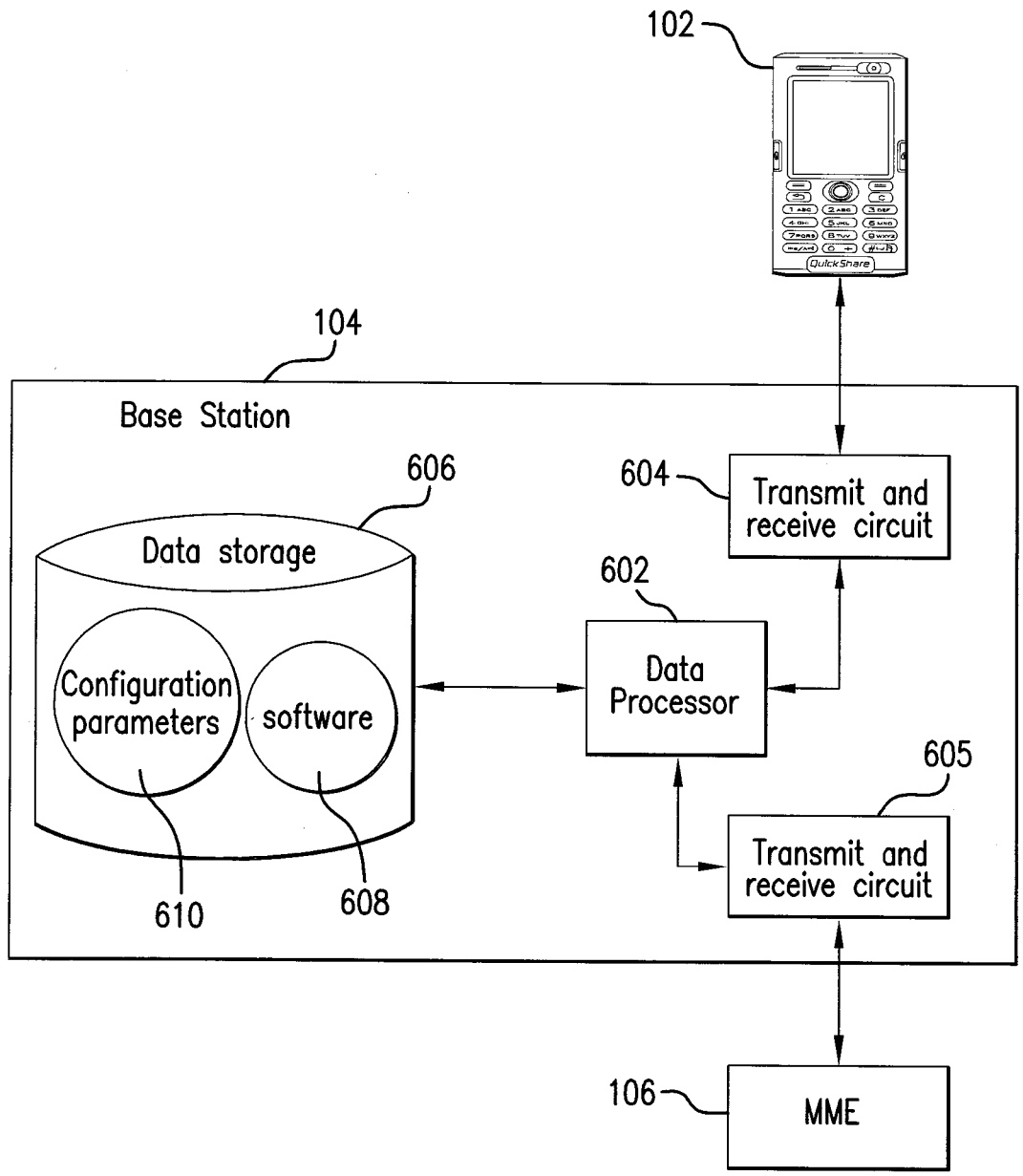
FIG. 6 is a block diagram that illustrates a node according to an embodiment of the invention.

Referring now to FIG. 6, FIG. 6 is a functional block diagram of a node 104 according to some embodiments of the invention. As shown, the node 104 may comprise a data processing system 602 (e.g., one or more microprocessors), a data storage system 606 (e.g., one or more non-volatile storage devices) and computer software 608 stored on the storage system 306. Configuration parameters 610 may also be stored in storage system 606. The node 104 also includes transmit/receive (Tx/Rx) circuitry 604 and 605 for transmitting data to and receiving data from the UE 102, and the MME 106, respectively.

The software 608 is configured such that when the processing system 602 executes software 608, node 104 performs steps described herein (e.g., steps described above with reference to the flow chart shown in FIG. 2 or 4). For example, the software 608 may include: (1) computer instructions for transmitting to another node a first handover message that indicates that the UE requires a handover; (2) computer instructions for receiving a second handover message transmitted from the another node in response to the first handover message, (3) computer instructions for transmitting from the source node a reconfiguration message to the UE in response to receiving the second handover message; (4) computer instructions for continuing to schedule the UE after transmitting the reconfiguration message until a particular message is received; and (5) computer instructions for receiving a context release message transmitted from the another node indicating that the UE has been handed over to the target node.

Additionally, the software 608 may include: (1) computer instructions for receiving a handover request message transmitted from another node; (2) computer instructions for transmitting to the another node a handover acknowledge message in response to the handover request message; (3) computer instructions for receiving at the target node a message transmitted from the UE comprising a DL count value and a UL count value after transmitting the handover acknowledge message and before scheduling the UE in the target node; and (4) using the DL count value and/or the UL count value in a communication with the UE after receiving the message from the UE.

Figure 7:
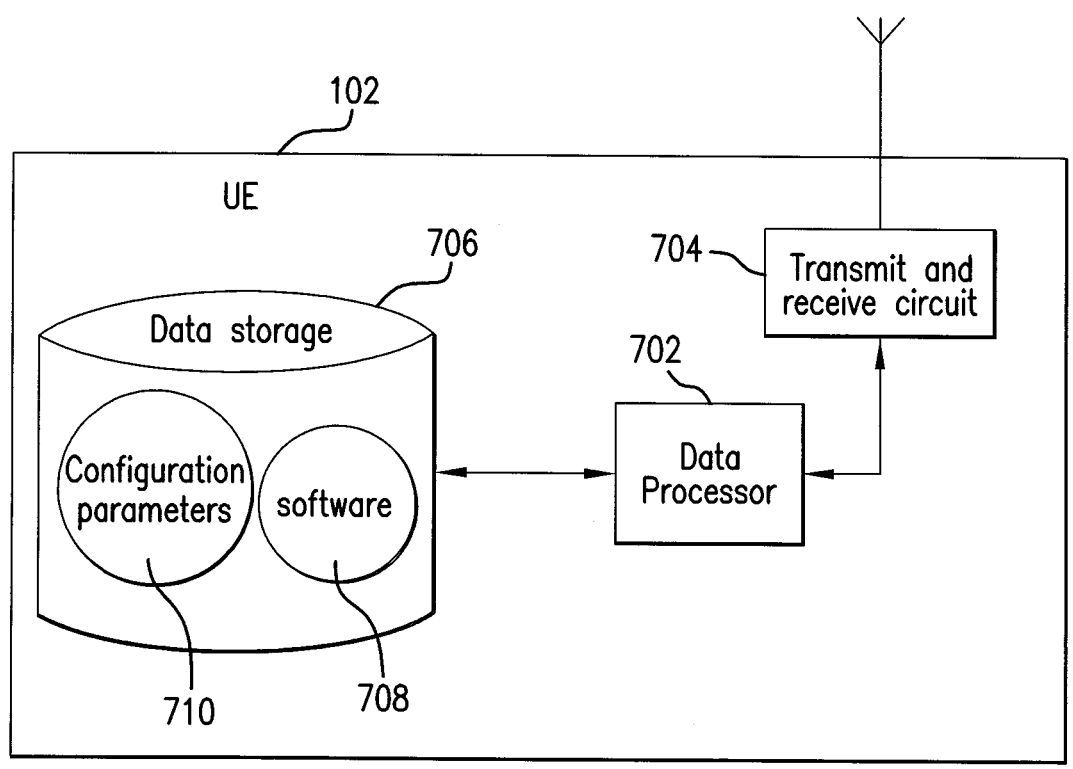
FIG. 7 is a block diagram that illustrates a UE according to an embodiment of the invention.

Referring now to FIG. 7, FIG. 7 is a functional block diagram of a UE 102 according to some embodiments of the invention. As shown, the UE 102 may comprise a data processing system 702 (e.g., one or more microprocessors), a data storage system 706 (e.g., one or more non-volatile storage devices) and computer software 708 stored on the storage system 706. Configuration parameters 710 may also be stored in storage system 706. The UE 102 also includes transmit/receive (Tx/Rx) circuitry 704 for transmitting data to and receiving data from node 104, respectively.

The software 708 is configured such that when the processing system 702 executes software 708, UE 102 performs steps described herein (e.g., steps described above with reference to the flow chart shown in FIG. 2 or 4). For example, the software 708 may include: (1) computer instructions for establishing a connection with a source node; (2) computer instructions for transmitting data units to and receiving data units from the source node after establishing the connection; (3) computer instructions for receiving from the source node a reconfiguration message identifying a target node; and (4) computer instructions for transmitting to the target node a message comprising a DL count value and an UL count value after receiving the reconfiguration message.

While various embodiments of the present invention have been described above, it should be understood that they have been presented by way of example only, and not limitation. Thus, the breadth and scope of the present invention should not be limited by any of the above described exemplary embodiments.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for handing over a user equipment (UE) from a source node to a target node, comprising:
   transmitting from a source node to another node a first handover message, wherein the first handover message requests handover of a connection associated with a UE;
   receiving at the source node a second handover message, wherein the second handover message acknowledges receipt of the first handover message;
   in response to receiving the second handover message, transmitting from the source node a reconfiguration message to the UE;
   after transmitting the reconfiguration message from the source node to the UE, continuing to schedule at the source node transmissions for the connection of the UE until the source node receives a message of a first message type for the connection; and
   upon receiving at the source node the message of the first message type for the connection, ceasing to schedule at the source node transmissions for the connection.

2. The method of claim 1, further comprising receiving at the source node a context release message transmitted from the another node indicating that the connection for the UE has been handed over to the target node.

3. The method of claim 1, wherein the another node comprises the target node.

4. The method of claim 3, wherein:
   the first handover message comprises an X2 Application Protocol (X2AP) Handover Request message; and
   the second handover message comprises an X2AP Handover Request Acknowledge message.

5. The method of claim 4, wherein the message of the first message type comprises an end marker transmitted from a gateway.

6. The method of claim 1, wherein the another node comprises a mobility management entity (MME).

7. The method of claim 5, wherein:
   the first handover message comprises an S1 Application protocol (S1AP) Handover Required message; and
   the second handover message comprises an S1AP Handover Command message.

8. The method of claim 7, wherein the message of the first message type comprises an S1AP UE Context Release Command message.

9. The method of claim 7, further comprising refraining from transmitting a status transfer message from the source node to the MME responsive to the S1AP Handover Command message from the MME.

10. The method of claim 1, further comprising:
    after transmitting the reconfiguration message to the UE and before receiving the message of the first message type at the source node for the connection, transmitting UE data from the source node to the target node, wherein the UE data comprises data received from the UE or data intended for the UE.

11. The method of claim 1, further comprising:
after transmitting the reconfiguration message from the source node to the UE, continuing to (i) assign sequence numbers to downlink (DL) data units intended for the UE and (ii) deliver data units received from the UE to a core network node until the message of the first message type is received at the source node for the connection.

12. A method performed by a user equipment (UE), comprising:
establishing a connection with a source node;
transmitting data units to and receiving data units from the source node using the connection;
after establishing the connection, receiving from the source node a reconfiguration message identifying a target node; and
after receiving the reconfiguration message, transmitting to the target node a message comprising a downlink (DL) count value and an uplink (UL) count value for the connection.

13. The method of claim 12, wherein the message transmitted from the UE to the target node comprises a reconfiguration complete message.

14. The method of claim 12, wherein
the DL count value comprises (1) a sequence number or (2) a Hyper Frame Number (HFN) that the target node should assign to a DL data unit intended for the UE that does not have an assigned sequence number; and
the UL count value comprises (1) a sequence number or (2) a Hyper Frame Number (HFN).

15. The method of claim 12, further comprising:
after receiving the reconfiguration message, receiving a resource allocation from the source node; and
using the allocated resource to transmit a data unit.

16. A method for handing over a user equipment (UE) from a source node to a target node, comprising:
receiving at a target node a first handover message transmitted from another node, the first handover message indicating a handover has been requested for a connection associated with a UE;
transmitting to the another node a second handover message, wherein the second handover message acknowledges receipt of the first handover message;
after transmitting the second handover message and before scheduling the UE in the target node, receiving at the target node a message transmitted from the UE comprising a DL count value and a UL count value for the connection; and
after receiving the message from the UE, using the DL count value or the UL count value in transmitting data to the UE or in receiving data from the UE.

17. The method of claim 16, wherein the message transmitted from the UE is a reconfiguration complete message that was transmitted by the UE to the target node in response to a reconfiguration message transmitted to the UE from the source node.

18. The method of claim 16, wherein
the DL count value comprises (1) a sequence number or (2) a Hyper Frame Number (HFN) that the target node should assign to a DL data unit intended for the UE that does not have an assigned sequence number; and
the UL count value comprises (1) a sequence number or (2) a Hyper Frame Number (HFN).

19. The method of claim 16, further comprising:
receiving from the source node a DL data unit for the UE; and
determining whether the DL data unit should be transmitted to the UE, wherein the determination is based on the DL count value received from the UE.

20. An access point, comprising:
a first receiver configured to receive data from a user equipment (UE);
a first transmitter configured to transmit data to the UE;
a second transmitter configured to transmit data to a node;
a second receiver configured to transmit data to the node; and
a data processing system configured to:
transmit to the node a first handover message, wherein the first handover message requests a handover of a connection associated with a UE;
receive a second handover message, wherein the second handover message acknowledges receipt of the first handover message;
in response to receiving the second handover message, transmit a reconfiguration message to the UE;
after transmitting the reconfiguration message to the UE, continue to schedule transmissions for the connection of the UE until the source node receives a message of a first message type for the connection; and
upon receiving the message of the first message type for the connection, ceasing to schedule transmissions for the connection.

21. A user equipment (UE), comprising:
a transmitter configured to transmit data;
a receiver configured to receive data; and
a data processing system configured to:
establish a connection with a source node;
transmit data units to and receive data units from the source node using the connection;
after establishing the connection, receive from the source node a reconfiguration message identifying a target node; and
transmit to the target node a message comprising a downlink (DL) count value and an uplink (UL) count value in response to receiving the reconfiguration message.

22. An access point, comprising:
a first receiver configured to receive data from a user equipment (UE);
a first transmitter configured to transmit data to the UE;
a second transmitter configured to transmit data to a node;
a second receiver configured to transmit data to the node; and
a data processing system configured to:
receive a first handover message transmitted from the node, the first handover message indicating a handover has been requested for a connection associated with the UE;
transmit to the node a second handover message, wherein the second handover message acknowledges receipt of the first handover message;
after transmitting the second handover message and before scheduling the UE, receive a message transmitted from the UE comprising a DL count value and a UL count value for the connection; and
after receiving the message from the UE, using the DL count value or the UL count value in transmitting data to the UE or in receiving data from the UE.

* * * * *